Patented May 31, 1932

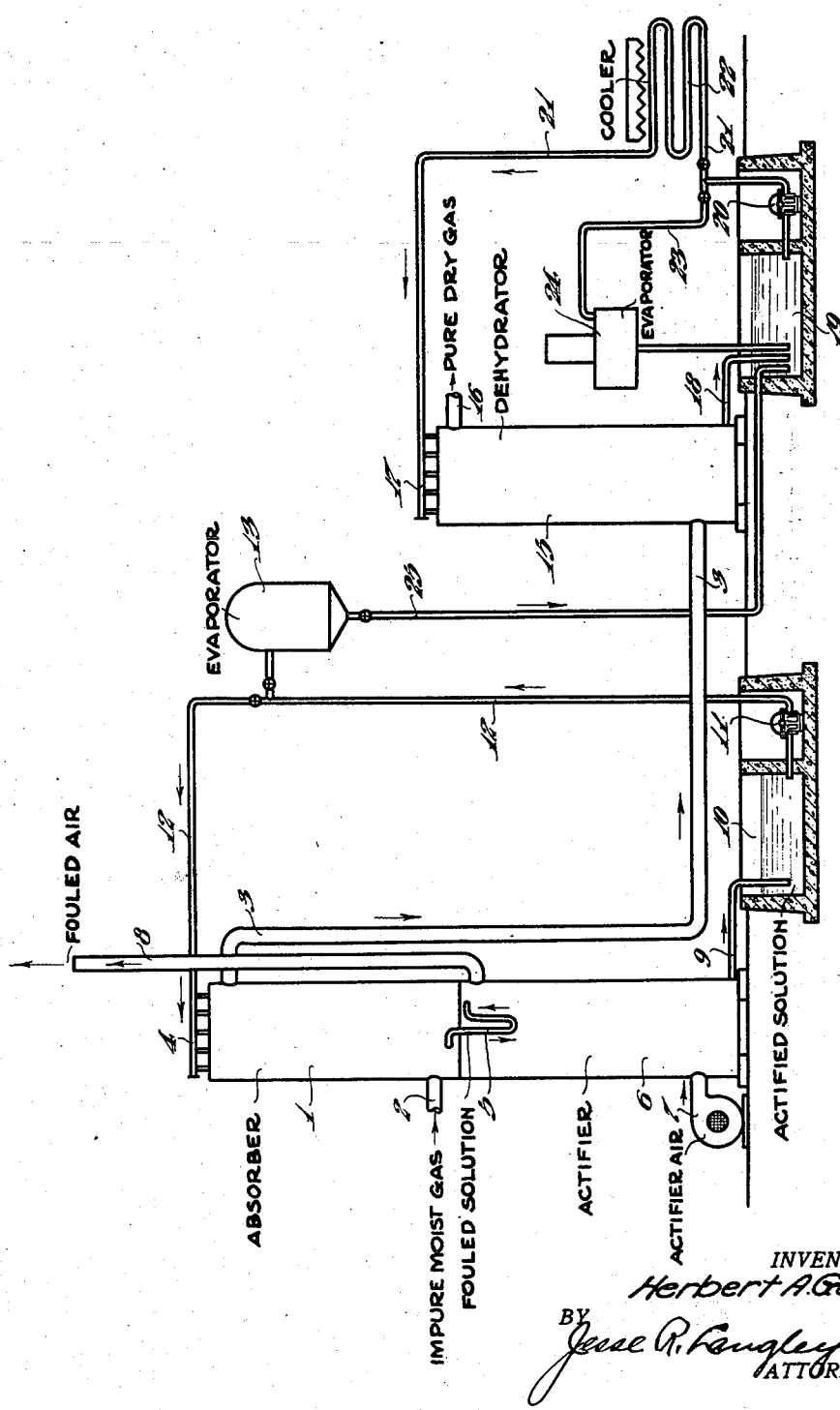

1,861,268

UNITED STATES PATENT OFFICE

HERBERT A. GOLLMAR, OF EAST ORANGE, NEW JERSEY, ASSIGNOR TO THE KOPPERS COMPANY, A CORPORATION OF DELAWARE

GAS DEHYDRATING PROCESS

Application filed September 11, 1928. Serial No. 305,333.

My invention relates to dehydration and especially to the dehydration of gases, such as fuel gas, air, or other gases.

My invention may be applied to the complete dehydration of such gases, but it has a particular application to the partial dehydration of fuel gases.

In the present and prior art of manufacturing and preparing fuel gas, for example, coke-oven gas, it is the common practice to cool the gas, after removal of impurities and by-products, by direct contact with recirculated water in a so-called "final cooler." The gas then enters the gas holders or distributing mains with a dew point only slightly below atmospheric.

At almost any season, it generally happens that at least a part of the distributing system is at a temperature below the dew point of the gas entering it. Consequently, whenever the gas reaches a point where such temperatures exist, condensation of moisture occurs.

The presence of this condensed moisture has many disadvantages. Moisture is one of the prinicpal causes of internal corrosion of gas mains and of deterioration of service equipment, such as gas meters and the like.

Moreover, if condensed water is allowed to accumulate in the system, it may cause "surging" and even complete stoppage of the gas flow. In cold weather, freezing may occur, causing increased resistance to the flow of the gas and eventually stopping the flow entirely.

The provision of drips for the removal of condensate is an expensive and only partially effective remedy, and it has been realized in the gas industry for a long time that dehydration processes of a nature and cost satisfactory for the treatment of fuel gas would be very desirable.

The dehydration of fuel gas under ordinary conditions need only be carried far enough to lower the dew point of the gas to a temperature below any temperature which obtains in the distributing system. If this condition is maintained, condensation ceases, and substantially all the advantages of a dry gas are obtained.

A number of gas dehydration systems have been proposed, but such systems have not been widely adopted at the present time. In some systems, the employment of refrigeration has been advocated. Refrigeration, however, requires expensive apparatus and would not be economical for many plants.

On the other hand, the use of hygroscopic liquids, such, for example, as sulphuric acid, has been proposed, and in some instances adopted. But these hygroscopic liquids have been either highly corrosive as such, or of such character that any spray carried along by the gas eventually leads to corrosion troubles as bad, if not worse, than those encountered when the gas is not dehydrated at all.

Moreover, such liquids cannot be rendered alkaline in the presence of fuel gas. It is obvious that the use of an alkaline dehydrating agent greatly reduces the danger of corrosion of the mains and service equipment, as compared with the use of dehydrating agents of acid or even neutral reaction.

Accordingly, the objects of my invention include the provision of an improved dehydrating agent and a process of using the same, in which the disadvantages of the agents and processes of the prior art are avoided.

My invention has for further objects such other operative advantages and results as are hereinafter found to obtain.

In the treatment of gases for the removal of hydrogen sulphide and hydrogen cyanide by means of alkaline solutions or suspensions, it has been found that there are a number of side reactions which proceed concurrently with the principal reactions of absorption and actification that are carried out in the usual cycle of operation.

A number of products result from these side reactions, such, for example, as the thiosulphate and thiocyanate of sodium or whatever other alkaline agent is employed in the process, for example, ammonium. As the cycle is repeated, the concentration of such products rises, and portions of the absorbent liquid must be withdrawn and replaced with fresh absorbent liquid in order to maintain a proper efficiency in the system.

In general, when sodium carbonate is used as the primary alkaline agent, such removed portions of the absorbent liquid contain varying amounts of sodium thiocyanate, sodium thiosulphate, sodium carbonate and sodium bicarbonate.

I have discovered that such thiocyanates, and in particular sodium thiocyanate, have properties which render them highly advantageous as dehydrating agents.

For example, I have found that sodium thiocyanate solutions, which may be obtained in extremely high concentrations due to the high degree of solubility of this substance, exert a hygroscopic effect more than adequate to obtain the necessary dehydration of gas.

Moreover, such solutions may be rendered alkaline, as for example, by the addition thereto of small amounts of sodium carbonate, up to the saturation point of the solution with respect to sodium bicarbonate in the presence of the gas being purified.

By reason of this fact, corrosion of apparatus in the subsequent path of the gas by entrained dehydrating liquid is substantially entirely inhibited.

It is, of course, apparent that the fact that sodium thiocyanate may be prepared in the same plant, and is in fact produced as a matter of course when alkaline liquids are employed to remove acidic impurities from the gas, constitutes a further advantage of my invention.

This advantage is enhanced by the fact that the mother liquors removed from such purification processes contain alkalies in addition to the sodium thiocyanate. Consequenly, I need only concentrate such liquors to provide a satisfactory, novel and advantageous dehydrating medium.

In general, such concentration is preferably carried to a concentration of about 650 grams of sodium thiocyanate per liter. However, the range of concentrations suitable is very wide and varies with the degree of dehydration required.

A liquid containing the following substances in the concentrations recited has been employed successfully:

| | Grams per liter |
|---|---|
| Sodium thiocyanate ($NaSCN$) | 629.0 |
| Sodium thiosulphate ($Na_2S_2O_3$) | 71.4 |
| Sodium carbonate ($Na_2CO_3$) | 43.1 |
| Sodium bicarbonate ($NaHCO_3$) | 17.1 |

This solution at a temperature of 30° C. placed in contact with a moist gas, will reduce the dew point of that gas to approximately 15.7° C.

It is obvious that if such a solution is used to dehydrate a gas containing carbon dioxide, the ratio of sodium carbonate to sodium bicarbonate will change somewhat, but this will not materially affect the properties of the solution.

The concentration of the liquor may even be carried to such a point that in portions of the recirculating cycle said liquid is in a supersaturated condition.

The presence of sodium thiosulphate has little effect upon the properties of the solution, and as this is a valuable material for other uses, it is in general preferred to remove as much as is possible of this material from the gas purification mother liquor before using it as a dehydrating agent.

When solutions of sodium thiocyanate are employed as dehydrating agents for fuel gas, it is preferred to conduct the dehydration of the gas in a cyclic system, the liquid being continuously recirculated over the flowing gas and through a suitable cooling stage in which the heat absorbed from the gas is dissipated. A portion of the liquid is withdrawn continuously or intermittently for reconcentration in any suitable apparatus, in order to prevent undue dilution of the liquid by moisture absorbed from the gas. Mechanical losses of the liquid are replaced from time to time as necessary, preferably, when fuel gas is dehydrated, by supplying further liquid from the liquid purification plant.

In the drawing the single figure represents a diagram of the process including both the gas purification and dehydration operations.

Referring to this figure, the impure moist gas to be purified enters an absorber 1 through a conduit 2 and passes through the same, emerging through a conduit 3. During the course of travel of the gas through the absorber 1 it is washed with a suitable alkaline solution introduced through a plurality of sprays 4. A solution is prepared by dissolving sodium carbonate in water to form a solution of from 1 to 3% sodium carbonate.

The solution passing downward through the absorber 1 absorbs the acidic impurities from the fuel gas and becomes fouled, in which condition it passes through a conduit 5 into an actifier 6. In the actifier 6 the fouled solution is regenerated by a current of air or other suitable gas introduced through a blower 7. During the actification the impurities that were originally present in the fuel gas are largely released from the absorbent solution and pass out with the actifier air through a suitable conduit 8.

The regenerated or actified solution passes out of the actifier 6 through a conduit 9 into a sump 10 and is recirculated by means of a pump 11 and conduit 12 as before.

During the course of recirculation side reactions inevitably occurring in the solution result in the accumulation therein of considerable quantities of thiocyanates, thiosulphates, or the like, and it occasionally becomes necessary for a portion of the solution to be removed and replaced with fresh liquid. When this is the case, a portion of the solution is allowed to flow into an evaporator 13 and is there suitably concentrated for use in the dehydration system.

After leaving the absorber 1 the purified, but still moist, gas passes through the conduit 3 to a suitable dehydrator 15 which it traverses before passing out through a conduit 16.

During the passage of the gas through the dehydrator 15 it is washed with a hygroscopic solution introduced through sprays 17 and is thus dried. The solution passes out of the dehydrator 15 through a conduit 18 into a sump 19 and is recirculated by means of a pump 20 and a conduit 21 as before. A suitable cooler 22 is placed in a conduit 21 for the purpose of removing heat absorbed from the gas in the dehydrator 15.

As the hygroscopic solution gradually becomes more dilute by reason of the absorption of water from the gas, a portion of the solution is diluted from the cycle of recirculation, either continuously or from time to time, and passed through a conduit 23 into an evaporator 24 from which it returns to the sump 19.

In starting up the plant or in replenishing inevitable losses of the hygroscopic solution, suitable quantities are drawn as desired through a conduit 25 from the evaporator 13.

While two evaporators 13 and 24 have been shown, it is obvious that under many circumstances all the required evaporation can be conducted in a single evaporator.

While sodium thiocyanate is recited herein by way of example, other thiocyanates, and especially other soluble thiocyanates, and more especially the other alkali metal thiocyanates, such as potassium thiocyanate, may be employed as dehydrating agents with successful results.

In many installations, when suitable apparatus is provided, solid sodium thiocyanate may be employed as dehydrating agent, as this material is in itself strongly hygroscopic.

Moreover, my invention is not limited to the dehydration of fuel gas, but may be successfully employed for the dehydration of other gases, such as the air blast for blast furnaces, air for ventilating, and the like, and materials, objects and substances in general, within the scope of the following claims.

I claim as my invention:

1. The process of removing moisture from a gas which comprises washing the gas with a thiocyanate brine of such concentration and at such temperature that the vapor pressure of said brine is lower than the partial pressure of water vapor in the gas to be treated.

2. The process of removing moisture from a gas which comprises washing the gas with a solution of sodium thiocyanate of such concentration and at such temperature that the vapor pressure of said solution is lower than the partial pressure of water vapor in the gas to be treated.

3. The process of removing moisture from a gas which comprises washing the gas with an alkaline solution of thiocyanate of such concentration and at such temperature that the vapor pressure of said solution is lower than the partial pressure of water vapor in the gas to be treated.

4. The process of removing moisture from a gas which comprises continuously recirculating a thiocyanate brine through a cycle comprising an absorption stage wherein it is brought into contact with the gas for the removal of moisture therefrom, and a regeneration stage wherein the moisture content and temperature of said brine are reduced to such extent that the vapor pressure of the brine is lower than the partial pressure of the water vapor in the gas from which moisture is to be removed.

5. The process of removing moisture from a gas which comprises continuously recirculating a thiocyanate brine through a cycle comprising an absorption stage wherein it is brought into contact with the gas for the removal of moisture therefrom at such concentration and temperature that the vapor pressure of said brine is lower than the partial pressure of water vapor in the gas to be treated, and a regeneration stage in which said brine is treated for the removal of an amount of moisture substantially equal to that removed from said gas and cooled.

6. The process of removing moisture from a gas which comprises continuously recirculating a thiocyanate brine through a cycle comprising an absorption stage wherein it is brought into contact with the gas for the removal of moisture therefrom at such concentration and temperature that the vapor pressure of the brine is lower than the partial pressure of water vapor in the gas from which moisture is to be removed, and a regeneration stage in which at least a portion of said brine is heated to expel an amount of moisture substantially equal to that removed from said gas and said brine is cooled to dissipate absorbed heat from said gas by said brine and heat absorbed by said brine in said heating stage.

7. In the manufacture of fuel gas, the steps which include treating the fuel gas for the removal of acidic constituents in a cyclic system in which an alkaline solution is circulated through an absorption stage for removal of said impurities from the gas, and an actification stage in which the solution is aerated for regeneration, removing portions of said solution from time to time, concentrating said portions, and recirculating the thereby concentrated liquid over said fuel gas for the removal of moisture from said gas.

8. In the manufacture of fuel gas, the steps which include treating the fuel gas for the removal of acidic constituents in a cyclic system in which an alkaline solution is circulated through an absorption stage for removal of said impurities from the gas, and an actification stage in which the solution is aerated for regeneration, removing portions of said solution from time to time, concentrating said portions, and recirculating the thereby concentrated liquid through a cycle comprising an absorption stage wherein moisture is removed from said fuel gas and a regeneration stage, wherein the solution is treated for the removal of an amount of moisture substantially equal to that removed from the gas and cooled.

In testimony whereof, I have hereunto subscribed by name this 4th day of September, 1928.

HERBERT A. GOLLMAR.